UNITED STATES PATENT OFFICE.

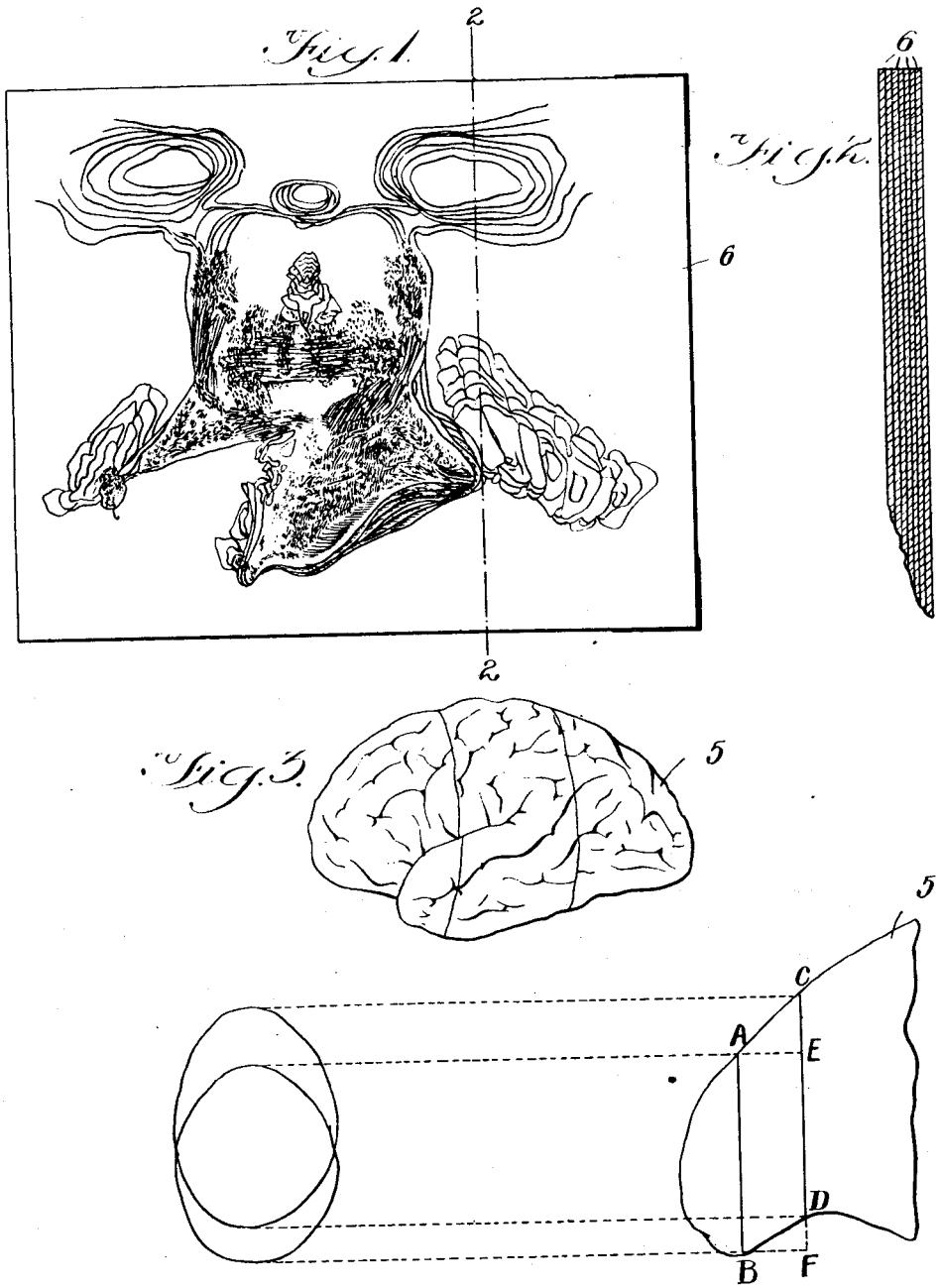

HASHIME MURAYAMA, OF NEW YORK, N. Y.

TRANSPARENT MODEL FOR ANATOMICAL STUDY.

1,141,480.        Specification of Letters Patent.        Patented June 1, 1915.

Application filed August 11, 1914. Serial No. 856,306.

*To all whom it may concern:*

Be it known that I, HASHIME MURAYAMA, a subject of the Emperor of Japan, residing in the city, county, and State of New York, have made a new and useful Invention in Transparent Models for Anatomical Study, of which the following is a specification.

This invention relates to transparent models for use in studying anatomical specimens, tissues, cells, or the like.

The object of the invention is to provide a transparent model for the use of students and others in the study of anatomical specimens, tissues, cell structures or the like, which is simple, economical to manufacture, and efficient.

Other objects of the invention will appear more fully hereinafter.

The invention consists substantially in the construction, combination, arrangement and location of parts all as will be more fully hereinafter set forth, as shown in the accompanying drawings, and finally pointed out in the appended claims.

Referring to the accompanying drawing, and to the various views and reference numerals appearing thereon,—Figure 1 is a face view of a completed model embodying my invention. Fig. 2 is a transverse section of the same on the line 2, 2, Fig. 1, looking in the direction of the arrows, the superimposed plates being broken off. Fig. 3 is a view showing a portion of a plate. Fig. 4 is a diagram showing the method of sectioning an anatomical specimen to be studied.

In the study of anatomy it is common practice to make up specimens of particular parts to be studied by cutting such parts into minute sections in parallel planes minute distances apart, and to suitably move the individual sections upon a glass plate or other support for study under the microscope. By reason of the difficulty in securing such sections or specimens for study under a microscope, the availability thereof to students, classes or others, is very much prescribed. It has been proposed to reproduce the specimen sections of the character referred to in enlarged drawings on glass plates, each plate having a drawing of a section of the specimen taken at a different line or in a different plane from the others. As heretofore constructed, the work of producing such plates has been exceedingly tedious and expensive, requiring special artistic skill to produce drawings and days of time to complete the same for each plate, and by reason thereof they have not come into such general use as their value and importance demands.

It is among the special purposes of my present invention to provide a model composed of a number of transparent plates superposed upon each other, each having a photographically reproduced enlarged drawing of a section of specimen to be studied, adjacent drawings being of sections a definite distance apart, and which model is simple and efficient, and of such construction that it may be produced quickly and inexpensively in large quantities, thereby placing them easily within the reach and means of students, classes, or others desiring to use them in pursuing their anatomical studies.

While my invention is applicable to the study of any desired anatomical specimen, or any desired organ, or portion of the body, as well as of other objects, I will describe it, for illustrative purposes, as applied to the study of human brain specimens.

In order to construct a model embodying the principles of my invention, a specimen to be studied is selected and is sectioned and the sections mounted as above explained upon glass or other plates. Under ordinary circumstances I have found that it is sufficient to section or divide the specimen into say, 100 sections to the inch, and to employ each tenth or twentieth section in making up a model. The important thing being to insure that the enlargements of the drawing shall preserve the same ratio of conformation as the original organ, cell or portion, and consequently the particular serial sections employed may vary according to the requirements, so long as the proper serial relation throughout the entire object is preserved. Each individual specimen section thus selected is then projected, or the enlarged image thereof is projected by any suitable projecting apparatus onto a sheet of specially prepared paper and the outlines of the projected image of the sectioned specimen is then traced upon the paper in india ink or other material suitable for the production therefrom of a "negative" or a "negative print" or "negative plate" which may be made in the usual way, such, for instance, as by the collodian method. In making the initial outline drawings of the various sections it is essential to preserve the same degree of enlargement of all the sections of the specimen. From the enlarged drawings thus made I take, say, the first tenth, twentieth, and so on in serial order of the completed drawings, or it may be any other desired serial order thereof, and make from each a negative, negative print or plate. Each original section or specimen is then examined under a microscope, if necessary, and the details thereof filled in on the outline drawing, distinctive colors being employed, if desired, to bring out in the drawing the various tracts, ducts, or other desired characteristics or features of the specimen. From each negative I photographically reproduce the drawing thereon on glass or other transparent plates and on as many plates as there are models to be made. The transparent plates should be carefully and specially selected as to the quality and thickness thereof, in order to secure the best results in the completed models. Each plate is first treated by applying thereto, or to the surface thereof, a solution of the following ingredients, and in substantially the proportions stated, namely, calcium carbonate 100 parts, 95% alcohol 250 parts, ammonia 250 parts, water 250 parts. This solution may be applied to the surface of the plates in any suitable manner, such for instance, as by rubbing the same over the surface of the plates. After the application of the solution, as above pointed out, I next apply to the surface of the plate a solution of the following ingredients in about the proportions stated, namely iodin 1 part, 95% alcohol 250 parts.

To the surface of each plate, after being treated as above described, I next apply thereto a colloidal or sensitized coating or film. This coating or film may be applied in any suitable or convenient manner. The important thing to be observed is that the coating or film be applied uniformly over the glass plate, that is, the coating or film should be of uniform thickness. I have found that a coating or film composition made of fish glue or ordinary commercial "Le Page" glue, 80 grams, the whites of two eggs, and water, 120 cubic centimeters, thoroughly mixed together, having 9 grams of ammonium bichromate dissolved therein, will well answer the purpose. After the application of the coating or film, as above explained, the plate is permitted to dry in any suitable or convenient manner, and the plate is then ready to be used in the reproduction of the enlarged drawing, that is, for the photographic reproduction thereon of the enlarged drawing, as above explained, from the "negative plate" produced as described. The "negative plate" is superimposed on the sensitized plate and subjected to the action of the actinic light rays for the required length of time to accomplish the desired results. If direct sunlight is employed, I have found that in the latitude of New York city for instance, an exposure of from two to five minutes is sufficient. The time of exposure, however, will vary according to the latitude as well as with the season of the year. In case an artificial arc or other source of artificial light is employed, the length of exposure may be uniform. As a result of the exposure of the "negative" plate upon the sensitized surface of the glass plate, a faint impression or image of the drawing becomes visible on the sensitized surface of the glass when the "negative" plate is removed. The glass plate is then immerged in fresh water for a few minutes. This causes the image of the drawing to become fixed upon the surface of the plate, while the coating or film, or that portion thereof which was not affected by the actinic light rays, becomes considerably swollen. By slightly agitating the glass plate in the water, or by means of cotton wool, or a camel hair brush, that portion of the coating which was not affected by the actinic light rays, is removed from the surface of the plate. The plate is then dried in any convenient manner and the reproduced image of the enlarged section drawing appearing on the plate is tinted or colored, if desired, or as required, or as occasion may call for. This tinting or coloring operation is accomplished in the same manner that the retouching of photographs is carried out. If permanency of color is desired, a proper mordant is employed. In this case it is preferable to employ coloring material the mordant of which contains alum, chrome-alum, bichromate, or tannin, or like agents, which will exert a hardening influence on the image. By thus reproducing the drawings on the sensitized plates by exposing the plate to the action of the actinic rays of light through the negative produced as above described, it will be readily seen that an exact photographic reproduction of the drawing is accomplished on the plate. It will be readily seen that as many glass plates may be employed with each negative plate as may be desired. That is, each "negative" plate image may be reproduced on as many glass plates as there are different models to be produced without incurring any more expense than that involved in ordinary photo-reproduction or printing and the manipulation of retouching ordinary photonegatives, and I also insure an absolute uniformity of the various plates produced from the "negative" plates without depending upon the individual skill of the artist to accomplish such reproduction as has been necessary in attempts to make models of this nature heretofore. This I regard as a most important feature of the product constituting my present invention.

The glass plates having the enlarged reproduced image of the anatomical specimen section produced thereon photographically, as above described, are now ready to be assembled to form the complete model. The model is made of as many glass plates, each containing a reproduced picture of a different section of the specimen, as may be necessary to include the entire area or volume of the anatomical specimen or other object to be studied, the various plates being placed flatwise upon each other in the required serial order and preserving the proper serial relation throughout the entire model. The assembled plates are then bound together in this serial relation to each other in any suitable manner and the model is completed and ready for use. The enlarged reproduced perspective outline of the entire organ to be studied in successive cross sections being presented to the eye by holding the model between the observer and the light.

Where, as is usual with most anatomical objects to be studied, as in the case of the human brain for instance, the object is irregular in surface outline, in order to secure the proper successive or serial relation of the cross sectional drawings in the completed model, it is necessary to properly adjust and fix the position of each glass plate with reference to the negative plate so as to conform to the physical exterior contour of the object under investigation at the point where the sectional picture thereof is taken with reference to such contour at the points where other sections of the same are taken. To accomplish this the negative of the enlarged drawing of the first section of the specimen, which I will call drawing No. 1, is employed to photographically reproduce said drawing on a plate. This plate, which I will call plate No. 1, is now superimposed upon the drawing of the negative plate of the next section in order of the selected serial relation, and which I will call drawing No. 2. By means of a photograph of the organ itself and suitable surface measurements obtained therefrom the required displacement of the image upon plate No. 2 with reference to that of plate No. 1 to produce the required successive or serial relation of the images on plates No. 1 and No. 2 in the finished model is easily obtained, and the plate No. 1 so superimposed on drawing No. 2 is correspondingly adjusted with reference to said drawing No. 2. Since all the glass plates are required to be of exactly the same dimensions the proper relative position of adjustment of plate No. 1 on drawing No. 2 is indicated on drawing No. 2 by angle marks at the four corners of said plate No. 1, which marks determine the exact position plate No. 2 should occupy with reference to drawing No. 2, when the image pictured on drawing No. 2 is to be transferred to plate No. 2 or to be photographically reproduced thereon after the latter has been treated and coated as above described. Similarly, plate No. 2 is adjusted on drawing No. 3 in order to ascertain and fix the proper position of plate No. 3 when the latter is applied to said drawing No. 3, and so on throughout the entire series.

In the accompanying drawing reference numeral 5 designates an anatomical specimen, such, for instance, as a portion of the brain. This specimen is sliced transversely at various points as indicated by the lines A—B, C—D, Fig. 3. Ordinarily these slices are made in a definite predetermined distance apart, say, for example, 1/100 of an inch apart, and in making up the model, every tenth or other predetermined section is taken for photographic reproduction as above explained.

Reference numeral 6 designates a transparent plate, the surface of which is treated as above described. Each plate of the completed model carries an enlarged photographically reproduced drawing of one of the sections. In other words, an enlarged drawing is made from each predetermined serial section of the specimen and a negative plate is produced from each enlarged drawing, and then from the negative plate pictorial reproductions of the enlarged drawing are made upon the sensitized surface of transparent plates. The completed model is built up from these plates arranged in serial order, and it gives a skeleton outline of the entire body of the specimen to be studied.

From the foregoing description it will be seen that I provide an exceedingly simple and inexpensive transparent model for use in the study of anatomical subjects which brings such models within the easy reach and means of students or other investigators, and that each model is made up of successive or serial outlines or sections of the specimen photographically reproduced on transparent plates which are assembled together in corresponding serial order thereby presenting to the eye the entire skeleton outline of the body of the organ to be studied. By reason of the various sections of the specimen being photographed or otherwise reproduced in drawings and then photographically reproduced upon the glass plate I am enabled to avoid the necessity of relying for accuracy in the reproductions upon the skill of individual artists in making such reproductions. At the same time I am enabled to reproduce the enlarged drawings or sections of the specimens upon transparent plates rapidly and at small cost. I am thus enabled to vastly reduce the cost of production of models of the class and nature referred to.

I do not claim herein the method involved in producing the models in question as the same forms the subject matter of my pending application for patent, Serial No. 795,811, filed October 17, 1913. But Having now set forth the object and nature of my invention and a construction embodying the principles thereof, what I claim as new and useful and of my own invention, and desire to secure by Letters Patent, is,—

1. A transparent model for use in studying anatomical specimens comprising transparent plates each having reproduced thereon photographically an enlarged drawing of a transverse section of the anatomical specimen, said plates being assembled in serial order and each containing a photographically reproduced drawing of a corresponding different serially separated section of the specimen.

2. A transparent model for use in studying anatomical specimens comprising a series of transparent plates superimposed the one upon the other and each containing a photographically reproduced enlarged drawing of a transverse section of the specimen to be studied.

3. A transparent model for use in studying anatomical specimens comprising a series of transparent plates superimposed the one upon the other each containing a photographically reproduced enlarged drawing of a transverse section of a specimen to be studied, the reproduced drawing of the section of one plate being of a section taken at a different point from that of the next succeeding plate in regular serial order.

4. A transparent model for use in studying anatomical specimens comprising a series of transparent plates superimposed upon each other, each plate containing the picture of a different section of the specimen, said plates being assembled in successive predetermined serial relation corresponding to the relatively displaced sections.

5. A transparent model for use in studying anatomical specimens comprising a series of transparent plates each plate containing a picture of a section of the specimen, said sections being at points a uniform distance apart serially, and said plates assembled flatwise upon each other in corresponding serial relation.

In testimony whereof I have hereunto set my hand in the presence of the subscribing witnesses, on this 17th day of July, A. D., 1914.

HASHIME MURAYAMA.

Witnesses:
W. C. DARBY,
S. E. DARBY, Jr.